US009643892B2

(12) United States Patent
Andersin et al.

(10) Patent No.: US 9,643,892 B2
(45) Date of Patent: May 9, 2017

(54) PCBN MATERIAL, METHOD FOR MAKING SAME, TOOLS COMPRISING SAME AND METHOD OF USING SAME

(71) Applicants: Element Six Limited, County Clare (IE); Element Six Abrasives S.A., Luxembourg (LU)

(72) Inventors: Stig Åke Andersin, Robertsfors (SE); Antionette Can, Oxfordshite (GB)

(73) Assignees: ELEMENT SIX ABRASIVES S.A., Luxembourg (LU); ELEMENT SIX LIMITED (IE)

( * ) Notice: Subject to any disclaimer, the term of this patent is extended or adjusted under 35 U.S.C. 154(b) by 0 days.

(21) Appl. No.: 14/784,648

(22) PCT Filed: Apr. 28, 2014

(86) PCT No.: PCT/EP2014/058569
§ 371 (c)(1),
(2) Date: Oct. 15, 2015

(87) PCT Pub. No.: WO2014/177503
PCT Pub. Date: Nov. 6, 2014

(65) Prior Publication Data
US 2016/0052828 A1    Feb. 25, 2016

(30) Foreign Application Priority Data

Apr. 30, 2013  (GB) .................................. 1307800.1

(51) Int. Cl.
C04B 35/5831  (2006.01)
C04B 35/645   (2006.01)
C04B 35/626   (2006.01)

(52) U.S. Cl.
CPC ...... C04B 35/5831 (2013.01); C04B 35/6261 (2013.01); C04B 35/645 (2013.01); C04B 2235/3804 (2013.01); C04B 2235/386 (2013.01); C04B 2235/3839 (2013.01); C04B 2235/3843 (2013.01); C04B 2235/3847 (2013.01); C04B 2235/3856 (2013.01); C04B 2235/3865 (2013.01); C04B 2235/3886 (2013.01); C04B 2235/402 (2013.01); C04B 2235/404 (2013.01); C04B 2235/5409 (2013.01); C04B 2235/5436 (2013.01); C04B 2235/5445 (2013.01); C04B 2235/5454 (2013.01); C04B 2235/5463 (2013.01); C04B 2235/5472 (2013.01); C04B 2235/781 (2013.01); C04B 2235/783 (2013.01); C04B 2235/785 (2013.01); C04B 2235/786 (2013.01); C04B 2235/80 (2013.01)

(58) Field of Classification Search
CPC ............ C04B 35/645; C04B 2235/386; C04B 2235/3856; C04B 2235/3843; C04B 2235/3886; C04B 2235/3865; C04B 2235/3804; C04B 2235/3847; C04B 2235/5454; C04B 2235/5445
See application file for complete search history.

(56) References Cited

U.S. PATENT DOCUMENTS

| 8,148,282 B2 | 4/2012 | Kountanya et al. |
| 2005/0187093 A1 | 8/2005 | McHale et al. |
| 2011/0059311 A1 | 3/2011 | Dole et al. |

FOREIGN PATENT DOCUMENTS

| EP | 1780186 A2 | 5/2007 | |
| GB | 2491256 A | 11/2012 | |
| JP | H03273039 A | 12/1991 | |
| JP | H07108461 A | 4/1995 | |
| JP | 2009209004 A | 9/2009 | |
| KR | 20060135763 A | 12/2006 | |
| KR | 20070046002 A | 5/2007 | |
| KR | 20070092213 A | 9/2007 | |
| WO | 2006046124 A1 | 5/2006 | |
| WO | 2006046128 A1 | 5/2006 | |
| WO | WO 2006/046124 | * 5/2006 | ............... C22C 1/10 |

OTHER PUBLICATIONS

PCT International Search Report from Application No. PCT/EP2014/058569, dated Jul. 16, 2014 (4 pages).
Combined Search and Examination Report from Application No. GB1307800.1, dated Oct. 24, 2013 (6 pages).
Combined Search and Examination Report from Application No. GB1407405.8, dated Oct. 27, 2014 (6 pages).

* cited by examiner

Primary Examiner — Pegah Parvini
(74) Attorney, Agent, or Firm — Armstrong Teasdale LLP

(57) ABSTRACT

PCBN material consisting of cBN grains dispersed in a matrix, the content of the cBN grains being in the range of about 35 to about 70 volume % of the PCBN material. The matrix comprises at least one kind of chemical compound that includes aluminum (Al) and at least one kind of chemical compound that includes titanium (Ti). The size distribution of the cBN grains exposed at a surface of the PCBN material is such that at least about 50% percent of the total equivalent circle area (ECA) arises from cBN intercept lengths up to 5 microns. At least about 20 percent of the total ECA arises from cBN intercept lengths greater than about 5 microns.

7 Claims, 4 Drawing Sheets

PCBN MATERIAL, METHOD FOR MAKING SAME, TOOLS COMPRISING SAME AND METHOD OF USING SAME

CROSS-REFERENCE TO RELATED APPLICATIONS

This application is the §371 national stage of International Application No. PCT/EP2014/058569, filed Apr. 28, 2014, which claims priority to Great Britain Application No. 1307800.1, filed Apr. 30, 2013.

The disclosure relates generally to polycrystalline cubic boron nitride (PCBN) material, methods for making the PCBN material, cutter elements comprising it and methods of using it.

PCT patent application publication number WO/2006/046128 discloses a CBN compact for use in continuous, light-interrupted and medium to heavy interrupted machining of hardened steels such as case-hardened and ball-bearing steels. A disclosed compact comprises about 45 to about 75 volume percent CBN grains, which are of more than one average grain size and have average size less than 10 microns, preferably less than 5 microns. The compact also comprises a secondary hard phase including one or more of nitride, carbo-nitride or certain metal carbide compounds, as well as a binder phase present in an amount of about 5 to 30 mass percent of the secondary hard phase. The compact may contain tungsten carbide in an amount not exceeding 3 volume percent (of the compact).

PCT patent application publication number WO/2006/046124 discloses a method of making a powdered raw material composition for the manufacture of a CBN compact. The method includes attrition milling grains of a secondary hard material, a binder material and CBN grains to produce a mixture in which the grains of the secondary hard material and the binder material are fine (small). The average size of the CBN grains may be less than 10 microns, preferably less than 5 microns. Cemented tungsten carbide balls may be used in the attrition milling, which is likely to introduce no more than 3 volume percent or less than 3 mass percent tungsten carbide into the powdered composition. The attrition milling is capable of achieving finer grains and better homogeneity of materials in the sintered compact than the other milling methods, and homogeneous mixtures comprising nano-sized grains having average particle size of between about 200 to about 500 nanometers may be achieved. The small size of the secondary hard particles achieved by the disclosed method is likely to result in high strength of the CBN compact.

U.S. Pat. No. 8,148,282 discloses a sintered cubic boron nitride composite compact having a non-cBN portion, the compact comprising about 86 to about 90 mass percent cBN and the non-cBN portion consisting essentially of about 10 to about 14 mass percent aluminium nitride, aluminium di-boride and other borides of aluminium. The compact has a cBN grain size distribution that is at least bi-modal and comprises about 80 percent coarse particles ranging in size from about 10 to about 60 micron and about 20 percent fine particles ranging in size from about 1 about 12 microns.

There is a need for cutting tool elements comprising PCBN material, having enhanced working life, particularly but not exclusively when used for the intermediate interrupted machining of steel bodies.

Viewed from a first aspect, there is provided PCBN material consisting of cBN grains dispersed in a matrix (in other words, the matrix refers to all material comprised in the PCBN material, other than the cBN grains), the content of the cBN grains being in the range of about 35 to about 70 volume percent of the PCBN material; the matrix comprising at least one kind of chemical compound that includes aluminium (Al) and at least one kind of chemical compound that includes titanium (Ti); a plurality of cBN surfaces being coterminous with a substantially planar surface of the PCBN material; in which the size distribution of the cBN grains is such that at least about 50 percent of the total equivalent circle area (ECA) arises from cBN intercept lengths up to 5 microns; and at least about 20 percent of the total ECA arises from cBN intercept lengths greater than about 5 microns.

Owing to significant practical challenges in measuring the actual size distribution of the cBN grains in sintered PCBN, it will likely be helpful to characterise the size distribution at least partly in terms of quantities that can be measured directly and straightforwardly, and that are strongly related to the sizes of the cBN grains. Put differently, it may be helpful to characterise the size distribution of cBN grains in sintered PCBN in terms of one or more quantities that can be viewed as proxy for the cBN size distribution. Consequently, the disclosed PCBN material will partly be characterised in terms of statistical distributions of a quantity that can be derived straightforwardly from a directly measurable dimension of cBN grains exposed at a surface of the PCBN material, without the need for complex stereographic correction. As described below, this will be done in terms of 'equivalent circle areas' of exposed sections of the cBN grains, calculated from a sufficiently large number of substantially random 'intercept lengths' between points at the edges of the cBN sections.

Each ECA is calculated using a respective intercept length, being the length of a generally arbitrary straight line segment connecting a respective arbitrary pair of points on a boundary of a cBN grain, the boundary being coterminous with (in other words, intersecting or lying on) the surface of the PCBN material. Each ECA is calculated as the area of a circle having a diameter equal to a respective intercept length. A total ECA is the sum of all of all of a plurality of ECA's, calculated from a plurality of respective intercept lengths associated with respective cBN grains (in this disclosure and unless stated otherwise, an intercept length will mean a cBN intercept length, being associated with a cBN grain). In some examples, the cBN areas may be sections through corresponding cBN grains. While a particular given intercept length and corresponding ECA will unlikely be of much use, a statistically sufficient number of arbitrarily drawn intercept lengths, and consequently of corresponding ECA's, can provide information associated with the size distribution of the cBN grains within a sintered PCBN body; provided that that the intercepts and cBN grains are selected substantially randomly. More details and non-limiting examples of intercept length measurements and consequential ECA calculations will be described below after the captions of the accompanying drawings have been provided.

Various compositions and micro-structure aspects are envisaged for the PCBN material, non-limiting and non-exhaustive examples of which are described below.

In some examples, the content of the cBN grains may be at least about 27 mass percent or at least about 40 mass percent of the PCBN material. In some examples, the content of the cBN grains may be at most about 62 mass percent or at most about 50 mass percent of the PCBN material. The cBN content may be about 27 mass percent to about 62 mass percent of the PCBN material.

In some examples, the matrix may comprise titanium carbo-nitride or titanium carbide based material; in some examples the matrix may comprise titanium carbide material and/or titanium nitride material; and in some examples, the matrix may comprise carbide and/or carbo-nitride and/or nitride compounds of niobium, tantalum, vanadium or zirconium. The content of any one or more (in combination) of these materials may be at least about 75 mass percent or at least about 85 weight percent of the matrix; and/or at most about 92 mass percent of the matrix. For example, the content of any one or combination of these materials may be about 90 mass percent of the matrix.

In some examples, the matrix may comprise aluminium nitride. The matrix may comprise at least one aluminium boride compound and/or titanium diboride.

In some examples, the matrix may comprise titanium carbo-nitride and aluminium nitride, in which the combined content of the titanium carbo-nitride and the aluminium nitride may be at least about 80 mass percent or at least about 90 mass percent of the matrix; and/or the combined content may be less than 97 mass percent or at most about 95 mass percent of the matrix. In some examples, the content of titanium carbo-nitride may be at least about 35 mass percent or at least about 40 mass percent of the PCBN material, and in some examples, the content of titanium carbo-nitride may be at most about 50 mass percent of the PCBN material.

In some examples, the PCBN material may contain metal carbide grains comprised in the matrix, the content of the metal carbide grains being greater than 3 mass percent, at least about 4 mass percent or at least about 5 mass percent of the PCBN material. For example, the metal carbide grains may comprise or consist of tungsten carbide.

In some examples, the matrix may comprise or consist of polycrystalline material, the mean size of the grains comprised in the matrix material being less than about 1 micron (transmission electron microscopy, TEM, will likely need to be used to measure the grain size of the matrix material in some example PCBN materials). In some examples, the mean grain size of the sintered matrix material may be at least about 50 nanometers (nm), and/or at most about 1,000 nanometers (nm). This may arise from the use of very fine raw material powder for producing the matrix material, and in some examples, the mean grain size of the powder may be at most about 1 micron.

In some examples, the ECA and/or the intercept length frequency distribution may be bi-modal. For example, one mode may occur at less than 5 microns and another mode may occur in the range of about 8 microns to about 10 microns. In some examples, the ECA and/or the intercept length frequency distribution may be mono-modal, having a single mode (minor modes corresponding to substantially smaller peaks may also be present).

Disclosed PCBN material will likely be suitable for H05 to H30 hard turning of hardened steel having Rockwell C hardness of at least about 52 HRc. For example, disclosed PCBN material will likely be suitable for intermediate or H15 hard turning of such hardened steel.

Viewed from a second aspect, there is provided an insert for a cutter tool, comprising disclosed PCBN material and configured such that the PCBN material is capable of providing a cutter edge in use. The insert may comprise a ceramic film (which may also be referred to as a coating) attached to a boundary of the PCBN material adjacent a working surface of the insert. For example, the ceramic film may comprise one or more chemical compounds including titanium, aluminium, nitrogen and/or silicon.

Viewed from a third aspect, there can be provided a method of using a disclosed insert, the method including using the insert to cut steel having a Rockwell C hardness of at least 52 HRc. The steel comprised in a body may be configured such that the mode of the cutting is interrupted. The ratio of continuous cutting to interrupted cutting may be at least about 50 percent and at most about 95 percent. The method may include using the insert in an H05 to H30 hard turning operation. For example, the method may include using the insert in an H15 hard turning operation.

Viewed from a fourth aspect, a method of making disclosed PCBN material is provided, the method including providing a cBN aggregation comprising a plurality of cBN grains having a mass frequency distribution with respect to grain equivalent circle diameter (ECD), the frequency distribution having a first mode and a second mode, the first mode occurring an ECD greater than 0 microns and at most about 3 microns, and the second mode occurring greater than 3 microns; in which the cBN grains having ECD of greater than 0 microns to at most 3 microns account for at least about 30 percent of the cBN aggregation, and the cBN grains having ECD of greater than 3 microns account for at least about 20 percent of the mass of the cBN aggregation; combining the cBN aggregation with a source of aluminium (Al) and a source of titanium (Ti), and/or a source of Ti and Al, to provide a blended aggregation; forming a pre-sinter body comprising the blended aggregation and subjecting the pre-sinter body to a sufficiently high pressure and a sufficiently high temperature to provide PCBN material consisting of cBN grains dispersed in a sintered matrix comprising at least one kind of chemical compound that includes aluminium (Al) and at least one kind of chemical compound that include titanium (Ti); in which the mass of the cBN grains in the blended aggregation is sufficient for the content of the cBN grains in the PCBN material is in the range of about 35 to about 70 volume percent of the PCBN material.

Since the raw material cBN grains may be provided in the form of substantially free-flowing powder, known methods for measuring various aspects of the cBN raw material grain size distribution can be used. As mentioned previously, this is in contrast to the relative difficulty of measuring the cBN grain size distribution when they are dispersed throughout a hard matrix, to which they are likely to be very strongly bonded. Therefore, the disclosed PCBN material is characterised at least in part in terms of the statistical distributions of an ECA proxy-type quantity for the actual cBN size distribution, calculated from a substantially random population of intercept lengths through cBN grains. However, the precise mathematical relationship between the ECA distribution of the cBN grains in sintered PCBN material on the one hand, and a given aspect of the actual grain size distribution of the cBN raw material powder is not provided, since this would not be necessary for measuring and characterising certain aspects of the PCBN material. Consequently, the characterisations of the cBN grain size distribution in the sintered PCBN material on the one hand and of the cBN raw material grains on the one hand, are appropriately different.

In some examples, the pressure may be at least about 4 gigapascals (GPa) and the temperature may be at least about 1,000 degrees Celsius.

In some examples, the method may include introducing sufficient metal carbide material into the blended aggregation such that the content of the metal carbide grains in the PCBN material is greater than 3 mass percent, at least about 4 mass percent or at least about 5 mass percent of the PCBN material.

In some examples, metal carbide contained in example PCBN material may arise from a process of mixing, dispersing or comminuting relatively coarse cBN grains using a milling device, which may be performed in the process of manufacturing example PCBN material. In some examples, the process of manufacturing example PCBN material may include attrition milling raw material powder comprising cBN grains. The milling device may comprise cemented tungsten carbide elements for contacting the cBN grains, and the elements are likely to undergo a relatively high degree of abrasive wear, owing in particular to the relatively high content of relatively coarse cBN grains in raw material powder for disclosed PCBN material. In some examples, the amount of metal carbide material present in the PCBN material as a direct result of milling the relatively coarse cBN grains may be sufficient to introduce at least 3 mass percent metal carbide material into example PCBN material.

In some examples, the second mode may occur at an ECD of at most about 20 microns.

In some examples, the source of Al and/or the source of Ti, and/or of Al and Ti (for example, material comprising chemical compound containing both Al and Ti, such as $Al_3Ti$) may be in powder form.

In some examples, the method may include blending the cBN grains with the source of Al and the source of Ti, and/or the source of Al and Ti, by means of an attrition milling apparatus.

In some examples, the method may include providing a first cBN aggregation and a second cBN aggregation, the first and second cBN aggregations each comprising a plurality of cBN grains; the volumetric mean ECD (D[4,3]) of the first cBN aggregation being greater than 0 and at most about 3 microns, and the volumetric mean ECD of the second cBN aggregation being greater than about 3 microns.

In some examples, the mean volumetric mean ECD of the second cBN aggregation may be at most about 10 microns, and/or the mean volumetric mean ECD of the first cBN aggregation may be at most about 2 microns.

In some examples, the mean specific surface area of the first aggregation of cBN grains may be at least about 5 square meters per gram ($m^2/g$), and/or the mean specific surface area of the first aggregation of cBN grains may be at most about 0.5 square meters per gram ($m^2/g$). In some examples, the mean specific surface area of the cBN aggregation may be at most about 5 square meters per gram ($m^2/g$).

In some examples, the ratio of the mass of the first cBN aggregation to the mass of the second cBN aggregation may be at least 1:5 and at most 1:1.

Non-limiting examples will be described below with reference to the accompanying drawings, of which FIG. 1 shows a schematic scanning electron micrograph of an area of a polished surface of example PCBN material, in which a line for measuring grain intercept lengths is superposed on the micrograph;

Figure 3:
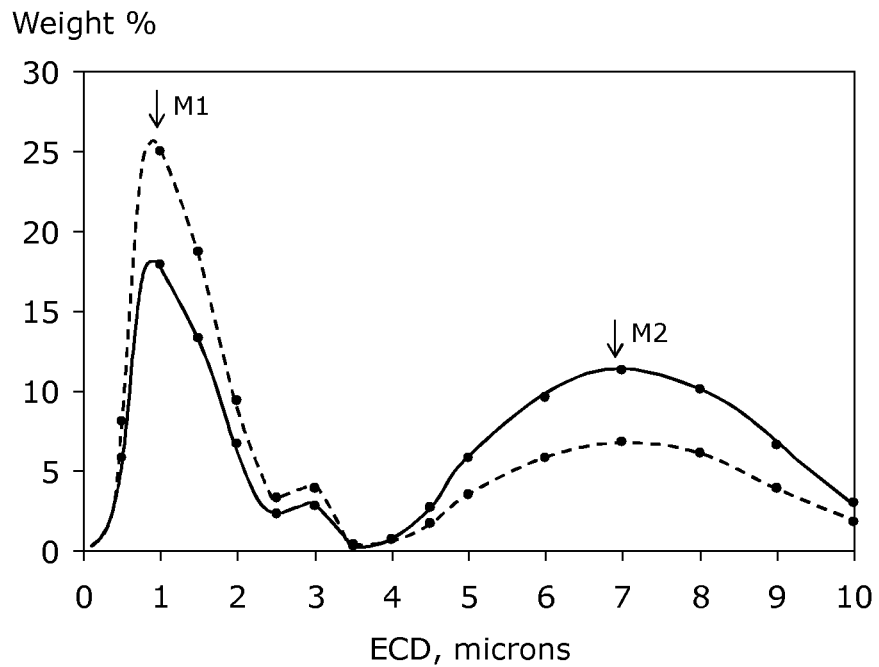
Figure 4:
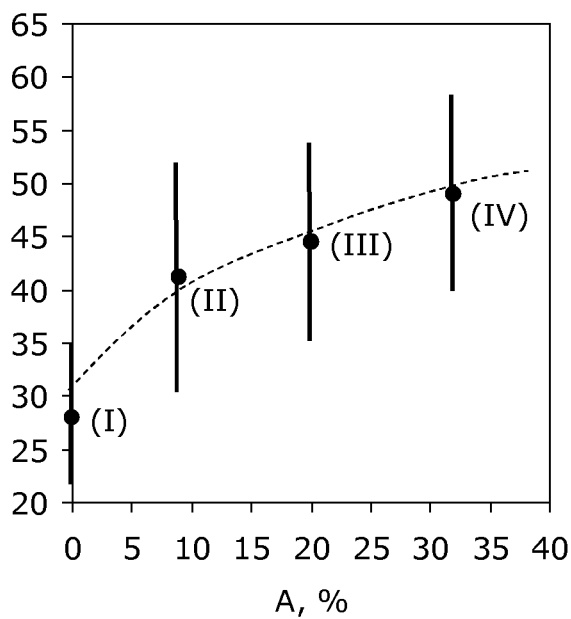

FIG. 3 shows a graph of two example mass frequency distributions versus equivalent circle diameter (ECD) of cBN grains in raw material powder for making example PCBN material; and FIG. 4 shows a graph of the working life L of a cutter tool comprising example PCBN, expressed in terms of number of passes until an end of life criterion was met in a turning test, versus the summed ECA associated with relatively large cBN grains, corresponding to intercept lengths of greater than 5 microns.

PCBN material according to this disclosure is characterised in terms of equivalent circle area (ECA), calculated using a respective intercept length associated with a cBN grain surface exposed at a polished surface of PCBN material. Each intercept length will be the length of a notional straight line segment connecting a pair of points on a boundary of an exposed cBN grain surface coterminous with the surface of the PCBN material. The ECA will be calculated as the area of a circle having a diameter equal to the intercept length. The total ECA for the measurement is obtained by integrating (summing) the ECA distribution over all intercept lengths measured.

The surface may be provided by cutting or grinding the PCBN materials, for example, or the surface may be substantially a surface of an article comprising the PCBN material.

A plurality of ECA's may be obtained from a magnified image of a surface of PCBN material, by measuring a plurality of intercept lengths using substantially randomly selected respective pairs of points lying on respective boundaries of substantially randomly selected exposed surfaces of cBN grains. The number of intercept lengths and consequently the number of ECA's will be sufficiently large to be sufficiently statistically significant to characterise the PCBN material in these terms. In some examples, more than about 1,000 intercept lengths (and consequently ECA's) may be used.

A plurality of intercept lengths can be obtained from a polished surface of example PCBN material by providing an electron microscope image of an area of the surface, and drawing one or more straight lines randomly across the image. This can be done manually or with the aid of a software application, such as image analysis software. A plurality of ECA's can be calculated using the plurality of respective intercept lengths. Different intercept lengths will likely occur at different frequencies. The intercept length frequency distribution can be represented as numbers of instances of measured intercept length being within certain intervals (bins) of intercept length, or as the combined ECA of intercept lengths falling within each interval.

In practice, the maximum intercept length value may be divided into a series of equal intervals, or bins, each bin having an upper and lower limit. Each of the measured intercept lengths can be assigned to a bin such that the intercept length is greater than the lower limit of the bin and at most the upper limit of the bin. Each bin may thus be assigned a number of measured intercept lengths, being the frequency of the intercept lengths corresponding to the bin. The frequency distribution of all the measured intercept lengths may be plotted graphically against a binned intercept length axis. The intercept length frequency distribution can be normalised by expressing the intercept length frequency value corresponding to each bin as a percentage of the total value obtained by summing all the values corresponding to all the bins.

Respective ECA frequencies can be calculated as the area of a circle having a diameter equal to the mean intercept length value of each bin, and multiplying the area value by the frequency value of the intercept lengths corresponding to the bin. The mean intercept length associated with each bin is calculated as half the sum of the upper and lower limits of the bin. Each bin may thus be assigned a multiple of the ECA corresponding to the respective bin, the factor being the number or percentage frequency corresponding to the respective bin. The distribution of all the ECA's calculated from all the measured intercept lengths may be plotted graphically against a binned intercept length axis. The ECA frequency distribution can be normalised by expressing the ECA frequency value corresponding to each bin as a percentage of the total value obtained by summing all the values corresponding to all the bins. The total ECA percentage corresponding to intercept lengths less than or at least some threshold value can be calculated by summing all the ECA frequency percentages corresponding to intercept lengths less than or at least, respectively, the threshold value.

The ECA frequency distribution can be determined according to the following procedure:

a) A body comprising or consisting of PCBN material is provided.

b) A substantially planar surface of the PCBN material is provided by cutting through the PCBN material, or by providing a body already having a substantially planar surface.

c) The surface is polished to be suitable for an image of the surface to be obtained by means of an electron microscope, and at least one micrographic image is obtained of at least one respective area of the PCBN surface.

d) At least the magnification, resolution and contrast of the image will be selected such that the cBN material exposed at the surface can be discriminated from the matrix material and at least about 100 cBN surfaces are evident in the image. Digital or manual image processing may be used to enhance the discrimination, provided that the correct length scale and integrity of the cBN surface shapes (boundaries) on the images are preserved.

Figure 1:
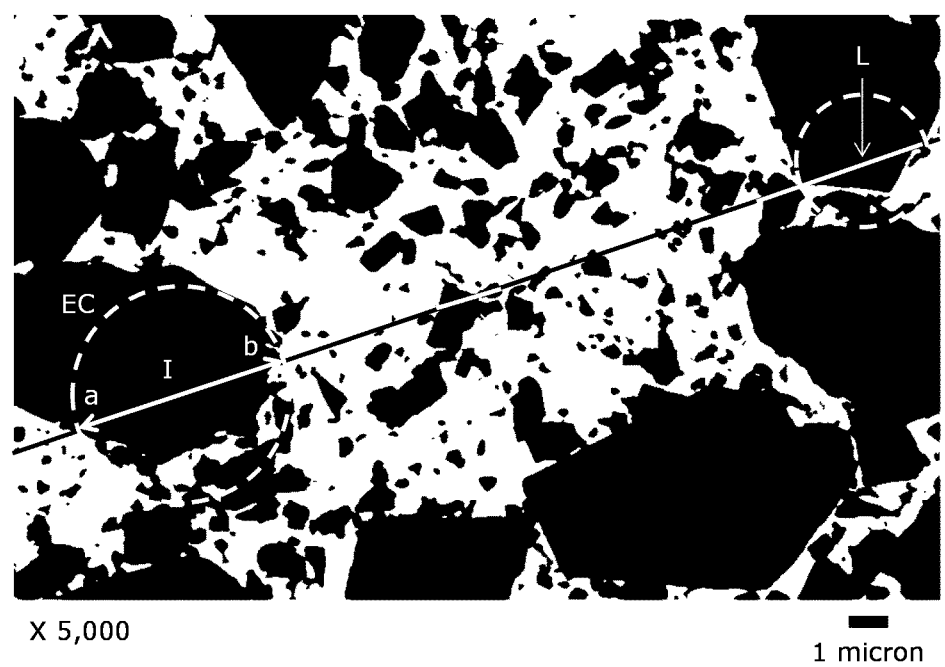

Once a suitable image has been provided, the following measurements are performed using the image or images, manually or by means of image processing and analysis software. With reference to FIG. 1, in which cBN grain areas are shown as black areas and the matrix as white area:

e) One or more straight line L (real or notional) is to be drawn at random across the image or images.

f) The lengths of each line segment l between points a-b at which the line intersects the boundaries of all respective cBN grain sections through which the line L passes, are measured, providing a list of at least 1,000 intercept lengths (more than one line and more than one image may need to be used).

g) A number frequency distribution is provided by allocating each intercept length l to one of a series of consecutive bins corresponding to equal intervals of intercept length, each bin having an upper and a lower length limit. One of a pair of consecutive bins is to have an upper limit of 5 microns and the other bin a lower limit of 5 microns (measured intercept lengths of 5 microns are to be assigned to the former bin).

h) A respective ECA is calculated for each bin, as the area of a circle having as its diameter the mean intercept length for the bin (the concept of an equivalent circle area as used in this disclosure, is illustrated schematically in FIG. 1 as circles EC corresponding to respective intercept lengths l connecting points a-b on a boundary of a cBN grain), i) An ECA distribution over the intercept length bins is calculated by multiplying the ECA corresponding to each bin by the frequency of intercept lengths falling within the bin (in other words, the number or percentage of measured intercept lengths falling within the bin). The resulting area values are summed to provide a total ECA for the measurement, and a respective percentage area value is calculated for each bin, in which each area value is divided by the total area value and expressed as a percentage. A normalised ECA frequency distribution is thus obtained.

j) The percentages of the ECA values corresponding to all bins having an upper limit of up to 5 microns, and the all bins having a lower limit of at least 5 microns are calculated by summing the respective ECA values over the respective intercept length bins.

Since no stereological correction to the intercept lengths is carried out using the procedure described above, the intercept length and ECA frequency distributions will not directly provide the actual size distributions of the cBN grains dispersed throughout the volume of the PCBN material. Rather, they are used as proxy values associated with the cBN grain size distribution, to be used for characterising the PCBN material according to this disclosure. This approach has the advantage that it can be applied directly from a magnified image of a PCBN surface without requiring complex image analysis applications, and avoiding the mathematical complexities arising from carrying out a stereological correction. Nevertheless, the distributions obtained according to this disclosure are useful in characterising PCBN material.

Various PCBN materials were made using different cBN aggregations, consisting of different respective cBN grain size distributions. All of the example PCBN materials comprised 60 volume percent cBN grains dispersed in a matrix comprising titanium carbo-nitride and aluminium carbo-nitride, and about 5 to 6 mass percent tungsten carbide grains (the volume and mass percentages both being percentages of the PCBN material). A minor amount of impurities such as oxide compounds was present. The content of the titanium carbo-nitride material was about 9 times that of the aluminium nitride material, in terms of mass percent of the matrix.

Each of the example PCBN materials was made in the form of a disc, which was cut by means of electro-discharge machining (EDM) to provide respective cross section surfaces through the discs. The section surfaces were polished and a scanning electron microscope (SEM) was used to obtain magnified images of each of the PCBN surfaces. Straight lines were drawn at random on each of the images, each of the lines crossing at least 10 cBN grain surfaces and intersecting the boundary of each cBN grain at two points, as illustrated in FIG. 1. The intercept lengths between the intersection points at the boundaries of the respective cBN grains were measured, using the appropriate length scale according to the magnification used to obtain the image. At least about 1,000 intercept lengths were thus obtained for each of the example PCBN materials, and assigned to one of ten intercept length bins, each bin being 1 micron wide and, when combined sequentially, corresponding to a combined length of 10 microns. The number of measured instances of intercept lengths within each bin was thus obtained. The ECA corresponding to each bin was calculated as area of a circle having diameter equal to the mean intercept length corresponding to the bin, and the number of instances in each bin was multiplied by the corresponding ECA for the bin to provide an ECA distribution across all the bins. The ECA distributions were normalised, so that the total combined ECA summed over all the bins is 100 percent.

Figure 2A:
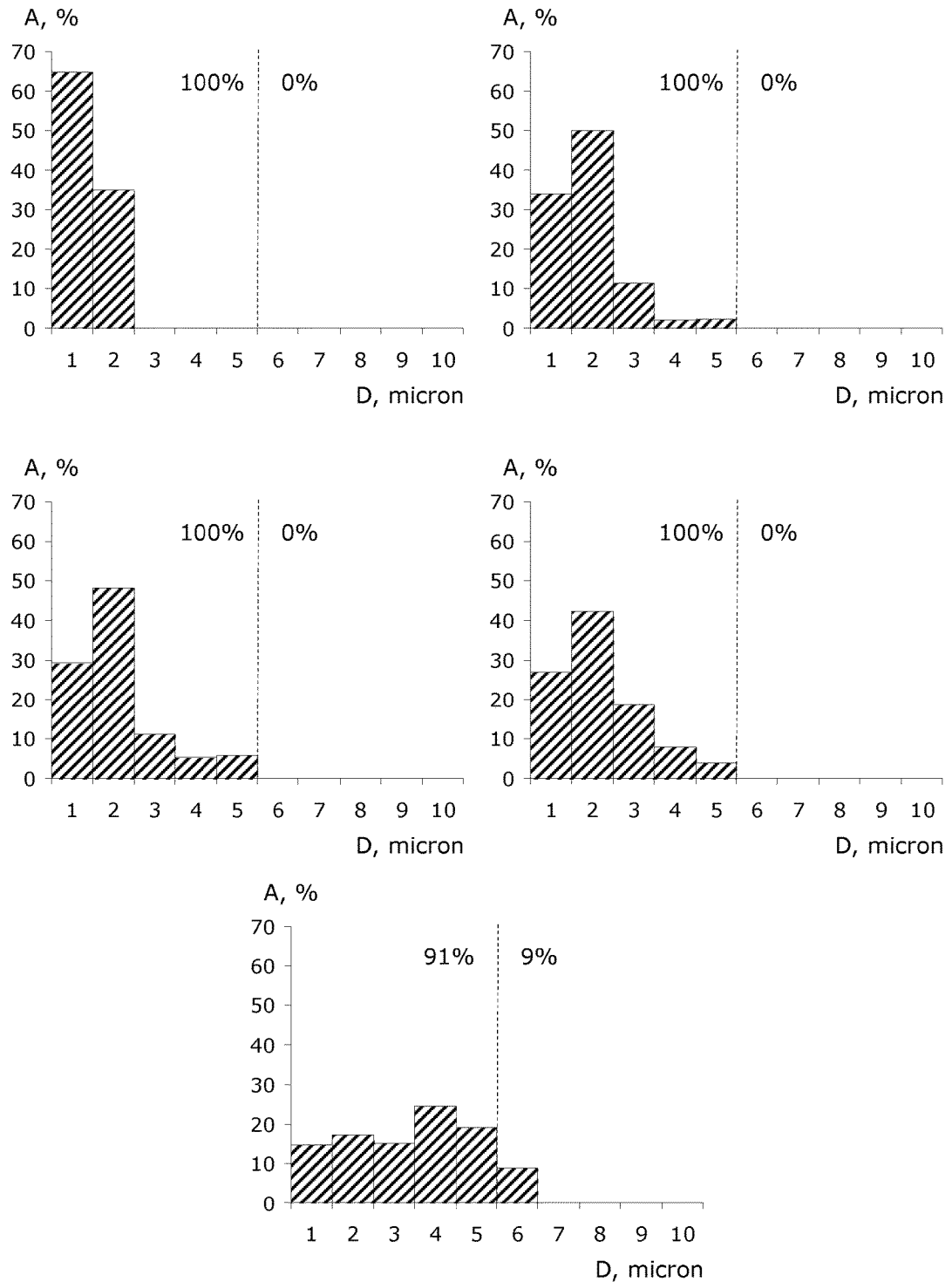
FIG. 2A shows five graphs of the ECA distributions of five respective example PCBN materials versus grain intercept length (these example PCBN materials do not fall within the scope of the claims)
Figure 2B:
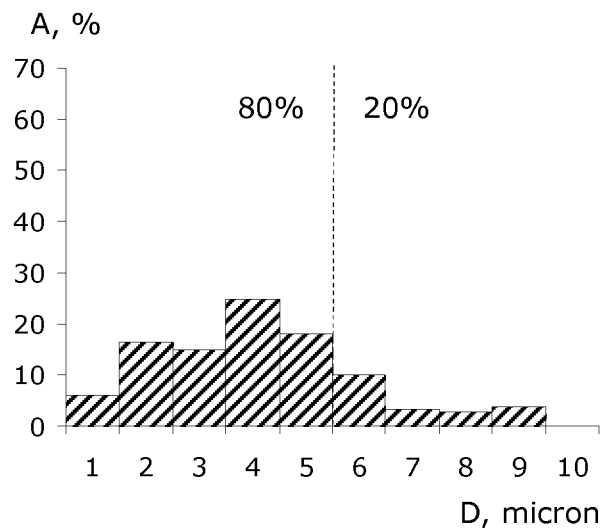
FIGS. 2B and 2C show graphs of the ECA distributions of two respective example PCBN materials versus grain intercept length.
Figure 2C:
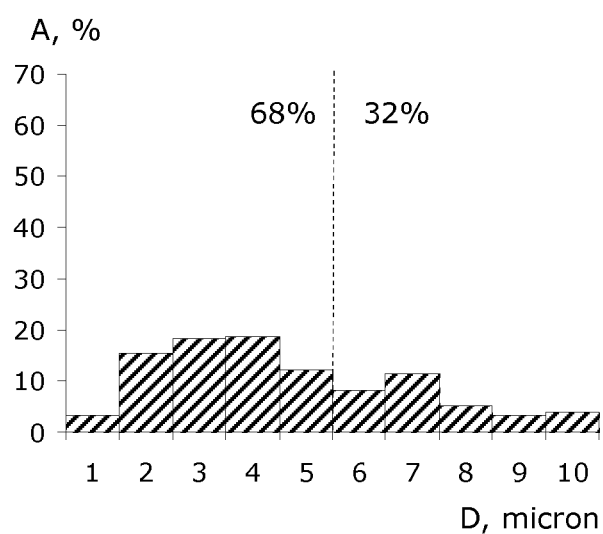

The graphs shown in FIGS. 2A, 2B and 2C show the ECA distributions of the various example PCBN materials, in which the equivalent circle areas A are expressed as percentages, corresponding to each of respective bins of the intercept length D. The summed percentage ECA corresponding to bins having an upper limits 5 microns or less is shown on the left hand side of a vertical dashed line (intersecting the horizontal axis at 5 microns) and the summed percentage ECA corresponding to bins having lower limit 5 microns or more is shown on the right hand side of the vertical dashed line.

The PCBN materials corresponding to the graphs shown in FIG. 2A are not within the scope of the claims, since substantially less than 20 percent of the total ECA arises from cBN intercept lengths greater than 5 microns in these examples. In four of the graphs, none of the intercept length bins corresponding to greater than 5 microns contributes substantially to the total ECA, and in one of the g, the bin corresponding to intercept length of greater than 5 microns and up to 6 microns contributes about 9 percent of the total ECA for the PCBN material.

The example PCBN materials corresponding to FIG. 2B and FIG. 2C are examples of PCBN material according to this disclosure. The size distribution of the cBN grains comprised in these example PCBN materials is such that about 80 percent (FIG. 2B) and 68 percent (FIG. 2C), respectively, of the total ECA arises from cBN intercept lengths up to 5 microns; and about 20 percent (FIG. 2B) and about 32 percent (FIG. 2C), respectively, of the total ECA arises from cBN intercept lengths greater than 5 microns.

An non-limiting example method of making the example PCBN material will be described. First and second substantially mono-modal cBN aggregations consisting of cBN grains, each having a single respective mode and size distributions having characteristics shown in Table 1 (other minor modes may be present, being substantially smaller than the principle modes). In this particular example, the first and second cBN aggregations were combined in the mass ration 70:30 to provide a combined a bi-modal cBN aggregation. The mass size distributions of two example cBN aggregations for making example PCBN are shown in FIG. 3. Both of these aggregations are bi-modal, having a first mode M1 at about 1 micron and a second mode M2 at about 7 microns, the peak defining the second mode being substantially broader in terms of grain size than the pea defining the first mode.

TABLE 1

| Grain size distribution parameters | First cBN aggregation | Second cBN aggregation |
| --- | --- | --- |
| Mode, micron | approx. 1 | approx. 7 |
| Volumetric mean grain size D[4, 3], microns | 1.15 | 6.42 |
| Area massed mean grain size D[3, 2], microns | 0.83 | 6.09 |
| Tenth percentile grain size d(0.1), microns | 0.45 | 4.65 |
| Median grain size d(0.5), microns | 1.00 | 6.25 |
| Ninetieth percentile grain size d(0.9), microns | 2.05 | 8.40 |
| Specific surface area, $m^2/g$ | 7.27 | 0.28 |

Powder comprising $Al_3Ti$ material was made by blending aluminium powder and sub-stoichiometric titanium carbo-nitride powder in the desired mass ratio, and heating the blended powder blend at about 1,025 degrees Celsius in a vacuum for a sufficient period for the powder to react chemically to form reacted powder comprising $Al_3Ti$ (the sub-stoichiometry of the titanium carbo-nitride powder was about 0.8), chemical compounds including carbon and chemical compounds including nitrogen including nitrogen. The reacted powder was crushed, sieved and then milled by means of an attrition mill for 4 hours, using hexane solvent and a small amount of dispersant material. The cBN grains were then introduced into the milled powder and the combined powder was further milled by means of the attrition mill for various period up to a maximum of 1 hour and the resulting slurry was dried by means of a rotary evaporator to provide a pre-sinter powder blend. The pre-sinter powder blend was then compacted to provide a pre-sinter disc, which was outgassed at 1,116 degrees Celsius. The pre-sinter disc was assembled into a capsule for an ultra-high pressure furnace (HPHT press) and sintered at about a pressure of about 5 gigapascals and a temperature of about 1,400 degrees Celsius to sinter the powders and provide a disc comprising example PCBN material. PCBN material in which the matrix comprises titanium carbide or titanium nitride can be made by a similar process, including pre-reacting titanium carbide or titanium nitride, respectively, with aluminium.

Various example PCBN material comprised in different PCBN discs were made as described above, differing in the respective size distributions of the cBN grains comprised in the respective cBN aggregations. The PCBN discs were cut and processed to provide cutter inserts having edge geometry SNMN090308 S02020 according to the International Standard ISO 1832 (Fourth Edition, 15 Jun. 2004, "Indexable inserts for cutting tools—designation", ISO 2004, Geneva) (under this nomenclature, the dimensions and other aspects of an indexable insert are designated by a code comprising at least nine symbols).

Each cutter insert was tested in a turning test (referred to as the "drilled 4340 test"), in which the cutter insert was used to machine (turn) a body consisting of hardened steel, under conditions selected to have similarities with H15 hard turning. Each test was terminated when the edge of the cutter, defined by example PCBN material, had become fractured to the extent that the size of the fracture scar (measured parallel to the cutting velocity vector) is greater than the mean size of the flank wear scar, or length of the flank wear scar reaches at least 0.3 millimeters. The occurrence of either of these occurrences was the end of life criterion, which may be evident in a relatively sudden change in the measured cutting force. Catastrophic edge fracture may occur before a flank wear land dimension of 0.3 millimeter (mm) has formed. The performance of the PCBN material can be reported in terms of the number of passes required for the end of life criterion to be achieved; the greater the insert life, the better the performance of the PCBN material in the test. This result is expected to provide an indication of the potential working life of the PCBN material in certain industrial machining applications involving the interrupted cutting of steel bodies.

The work-piece had substantially the same hardness throughout its volume (which may also be referred to as "through hardened"), the Rockwell C hardness being in the range of about 52 to 54 HRC, being a hardened steel material according to the AISI 4340 specification. The test is believed to provide a reasonably good indication of the potential performance of the PCBN material in machining case hardened steels (in particular but not exclusively) in many applications in practice. The work-piece and the cutting conditions were configured to subject the tool to a particular ratio of continuous and interrupted cutting conditions, this ratio being substantially constant for each cutting cycle (which may referred to as a "pass"). In particular, this ratio was kept substantially constant throughout the test by adopting a face-turning approach with constant surface speed control. The work-piece was configured as a tube having a tube wall of uniform thickness to enhance the uniformity of hardening radially through the wall (in accordance with the hardenability curves). A series of holes in the tube was provided parallel to the tube axis such that the diameter and pitch spacing of the holes is expected to present turning conditions likely to be representative of certain common hard turning operations in industry. The turning parameters used were a speed of 150 meters per minute (m/min), a feed of 0.1 millimeters (mm) and a depth of cut of 0.2 millimeters (mm).

The results of the turning tests using cutter inserts comprising various example PCBN materials are shown in FIG. 4, in which the cutter life L in terms of number of passes until the end of life criterion is plotted against the summed ECA percentage A corresponding to intercept lengths of greater than 5 microns. The evident trend is for the life L to increase as this summed ECA parameter increases, at least up to a value of about 35 percent. In physical terms, this suggests that the presence of a certain number of relatively coarser cBN grains has a beneficial effect, at least in turning applications of which the drilling 4340 test is broadly representative.

If the summed ECA corresponding to intercept lengths up to 5 microns is substantially less than about 50 percent, the strength of the PCBN material is likely to be too low and/or the surface finish on the work-piece too poor for certain applications.

If the summed ECA corresponding to intercept lengths greater than 5 microns is substantially less than 20 percent, then the working life of a cutter insert comprising the PCBN material will likely not be as high, and the chemical wear resistance of the PCBN material in use may be relatively poor.

Surprisingly, the disclosed PCBN material appears to have sufficient strength for effect hard turning, despite the presence of relatively coarse cBN grains, since PCBN comprising relatively small cBN grains have generally been used for hard turning applications. Also surprisingly, the disclosed method, in which the relatively coarse raw material cBN grains present in the raw material powder blend, appears substantially to preserve the coarse cBN grain fraction through to the sintered PCBN material product (attrition milling is a high power milling method and will likely result in higher amount of metal carbide material from the milling elements to be worn away and introduced into the raw material powder blend).

Another example PCBN material may comprise about 35 volume percent cBN grains (in this particular example, about 27 mass percent of the PCBN material), about 60 to about 62 mass percent titanium carbo-nitride material and about 3 mass percent to about 5 mass percent chemical compounds including aluminium, such as aluminium nitride. The balance of the matrix may comprise about 3 mass percent to about 6 mass percent tungsten carbide material.

Another example PCBN material may comprise about 70 volume percent cBN grains (in this particular example, about 62 mass percent of the PCBN material), about 30 mass percent titanium carbo-nitride material and up to about 3 mass percent chemical compounds including aluminium, such as aluminium nitride. The balance of the matrix may comprise about 3 mass percent to about 6 mass percent tungsten carbide material.

PCBN may be divided into two broad groups, namely "low cBN" and "high cBN", in which the cBN content is about 30 to 70 volume percent and about 70 to 95 volume percent, respectively. PCBN tool inserts are used to machine three broad groups of materials, namely hardened steel ("hard turning"), sintered powder metals comprising hard grains in a relatively softer matrix, and grey and hard cast irons. The degree of interrupted cutting may be rated on a scale of increasing interruption severity from H5 to H30. High CBN materials are likely to be used for operations involving a higher degree of interrupted cutting, which may occur as a result of shape features of the work-piece or the material comprised in it. Higher cBN content and lower mean cBN grain size tends to result in stronger PCBN, which is especially important for interrupted operations.

Although cBN is relatively unreactive with ferrous metals, chemical wear of CBN grains comprised in PCBN material is likely to be evident at the high temperatures reached in continuous machining. Therefore, high PCBN comprising a relatively high content of cBN grains is likely to be used in operations such as interrupted machining, in which the tool insert material needs to be relatively strong and maintain its hardness at relatively high temperatures. PCBN material comprising a relatively lower content of cBN grains is likely to be used in operations such as continuous machining, in which the tool insert material needs to be relatively resistant to chemical wear. The strength of PCBN material comprising relatively large cBN grains is generally likely to lower than that of PCBN material comprising relatively small (fine) cBN grains, all else being equal (this may be particularly evident where the content of cBN is relatively high). Therefore, fine grain PCBN is likely to be stronger and produce a better work-piece surface finish than coarser grain PCBN material. However, finer grained PCBN is likely to be more susceptible to chemical wear owing to the higher surface area of the cBN grains per unit volume of PCBN material, all else being equal. In general, therefore, PCBN comprising a high content of fine cBN grains is likely to be suitable for heavily interrupted machining on the one hand, and PCBN comprising a low content of coarser cBN grains is likely to be suitable for fast continuous machining on the other (provided that the cBN grain size is sufficiently small for the desired surface finish to be achieved).

In general, it may be expected that PCBN material comprising relatively coarse cBN grains would result in too poor a surface finish of the work-piece in some applications. Therefore, the cBN comprised in PCBN material for machining operations has tended not to be substantially greater than about 4 microns and most commercially used PCBN materials comprise cBN grains in the range of about 1 micron to about 2 microns.

Intermediate machining operations involving a degree of interrupted cutting in combination with high machining speeds pose a challenge for designing PCBN material. In certain applications, for example applications in which PCBN material is used to machine hardened steel in an intermediate interrupted mode (as characterised in the so-called "drilled 43/40"), there tends to be a degree of chemical as well as abrasive wear of the cBN comprised in the PCBN. The principal failure mode in such applications is chipping, which is believed to arise from the combination of chemical (crater) wear and impact associated with the interrupted nature of the work-piece.

Cutter inserts comprising disclosed PCBN material may be used to machine hardened steel, having hardness of at least about 52 HRC (Rockwell hardness scale C). The disclosed PCBN material may have a good combination of resistance to chemical wear, high toughness and high strength Certain terms and concepts as used herein are briefly explained below.

As used herein, a mode of a distribution is a local maximum value, occurring more frequently in the data than do other values within a range including the mode. Visually, a mode in a size distribution graph will be evident as a peak. For example, in a mono-modal distribution, only one peak is evident and there are no local maxima, or only very minor and insubstantial other peaks; in a bi-modal distribution, there are two and only two peaks evident, one of which may be a global maximum and the other may be a local maximum, or both may be substantially equal in frequency. In general, multi-modal distributions comprise at least two modes.

As used herein, the ECD distribution of a plurality of loose, unbounded and non-agglomerated grains can be measured by means of laser diffraction, in which the grains are disposed randomly in the path of incident light and the diffraction pattern arising from the diffraction of the light by the grains is measured. The diffraction pattern may be interpreted mathematically as if it had been generated by a plurality of spherical grains, the diameter distribution of which being calculated and reported in terms of ECD. Aspects of a grain size distribution may be expressed in terms of various statistical properties using various terms and symbols. Particular examples of such terms include mean, median and mode. The size distribution can be thought of as a set of values Di corresponding to a series of respective size channels, in which each Di is the geometric mean ECD value corresponding to respective channel i, being an integer in the range from 1 to the number n of channels used.

Mean values obtained by means of laser diffraction methods may be most readily expressed on the basis of a distribution of grain volumes, the volume mean can be represented as D[4,3] according to a well-known mathematical formula. The result can be converted to surface area distribution, the mean of which being D[3,2] according to a well-known mathematical formula. Unless otherwise stated, mean values of size distributions as used in the present disclosure refer to the volume-based mean D[4,3]. The median value D50 of a size distribution is the value dividing the plurality of grains into two equal populations, one consisting of grains having ECD size above the value and the other half having ECD size at most the value. The mode of a size distribution is the value corresponding to the highest frequency of grains, which can be visualised as the peak of the distribution (distributions can include more than one local maximum frequency and be said to be multi-modal). Various other values d(y) can be provided, expressing the size below which a fraction y of the plurality of grains reside in the distribution. For example, d(0.9) refers to the ECD size below which 90 percent of the grains reside, d(0.5) refers to the ECD size below which 50 percent of the grains reside and d(0.1) refers to the ECD size below which 10 percent of the grains reside.

The invention claimed is:

1. PCBN material consisting of cBN grains dispersed in a matrix, the content of the cBN grains being in the range of 35 to 70 volume percent of the PCBN material; the matrix comprising at least one kind of chemical compound that includes aluminium (Al) and at least one kind of chemical compound that includes titanium (Ti); a plurality of cBN grain surfaces being coterminous with a substantially planar surface of the PCBN material; in which the size distribution of the cBN grains is such that at least 50 percent of the total equivalent circle area (ECA) arises from cBN intercept lengths up to 5 microns; and at least 20 percent of the total ECA arises from cBN intercept lengths greater than 5 microns.

2. PCBN material as claimed in claim 1, in which the matrix comprises any of titanium carbo-nitride, titanium carbide or titanium nitride.

3. PCBN material as claimed in claim 1, in which the matrix comprises aluminium nitride and at least one aluminium boride compound.

4. PCBN material as claimed in claim 1, in which the matrix comprises titanium carbo-nitride and aluminium nitride, in which the combined content of the titanium carbo-nitride and the aluminium nitride is at least 80 mass percent of the matrix.

5. PCBN material as claimed in claim 1, in which the matrix comprises carbide, carbo-nitride or nitride compounds of niobium, tantalum, vanadium or zirconium.

6. PCBN material as claimed in claim 1, in which the matrix contains tungsten carbide grains, the content of the tungsten carbide grains being greater than 3 mass percent of the PCBN material.

7. PCBN material as claimed in claim 1, in which the matrix comprises polycrystalline material having mean grain size of at least 50 nanometers (nm) and at most 1,000 nanometers (nm).

* * * * *